United States Patent [19]
Wagner

[11] 4,329,828
[45] May 18, 1982

[54] MOLDING APPARATUS WITH SHEET APPLICATOR

[75] Inventor: Richard C. Wagner, Frankfort, Ill.

[73] Assignee: Hollymatic Corporation, Park Forest, Ill.

[21] Appl. No.: 231,578

[22] Filed: Feb. 4, 1981

Related U.S. Application Data

[62] Division of Ser. No. 86,761, Oct. 22, 1979, Pat. No. 4,302,868.

[51] Int. Cl.³ ..................... A22C 7/00; B65B 25/08
[52] U.S. Cl. ............................. 53/122; 53/157; 426/513; 17/32
[58] Field of Search .............. 53/122, 157; 17/32; 426/513

[56] References Cited

U.S. PATENT DOCUMENTS

| | | | |
|---|---|---|---|
| 2,684,501 | 7/1954 | Holly | 53/157 X |
| 2,757,411 | 8/1956 | Condon | 17/32 |
| 3,137,029 | 6/1964 | De Zolt | 17/32 |
| 3,293,688 | 12/1966 | Holly | 17/32 |
| 3,312,997 | 4/1967 | Merrels | 17/32 |
| 3,388,529 | 6/1968 | Holly | 53/122 X |
| 3,526,924 | 9/1970 | Holly | 17/32 |
| 3,589,711 | 6/1971 | Holly | 17/32 X |
| 3,747,160 | 7/1973 | Holly et al. | 17/32 |
| 3,851,442 | 12/1974 | Miles | 53/157 X |
| 3,887,964 | 6/1975 | Richards | 17/32 |
| 3,952,478 | 4/1976 | Richards et al. | 53/157 X |
| 3,964,114 | 6/1976 | Holly | 17/32 |
| 4,054,967 | 10/1977 | Sandberg et al. | 17/32 |
| 4,055,033 | 10/1977 | Garrett | 53/122 |
| 4,074,509 | 2/1978 | Miles | 53/157 X |
| 4,153,974 | 5/1979 | Holly et al. | 17/32 |
| 4,182,003 | 1/1980 | Lamartino et al. | 17/32 |

Primary Examiner—Willie G. Abercrombie
Attorney, Agent, or Firm—Wegner, McCord, Wood & Dalton

[57] ABSTRACT

A molding apparatus and method for molding patties of ground raw meat and the like that has a hopper for holding a supply of the meat, a mold having a patty shaped mold cavity, a ram equipped pressure chamber into which the meat is moved from the hopper and from which it is forced into a patty shaped mold cavity in the mold, means for moving the mold between a filling position for the cavity and an ejecting position for removal of the patty from the cavity and a lever system for moving the mold, meat transfer means in the hopper and the pressure ram all without substantial lost motion in order to avoid noise pollution that is an unwelcome side effect of machines such as patty molding machines that use such lost motion connections to provide pauses between relatively operating parts.

The disclosure also includes an apparatus for applying a separator sheet to each of a series of molded articles such as meat patties ejected in a path in which a movable carrier having sheet engaging means is movable through a path to withdraw a sheet from a supply and move the sheet into a supporting frame in which the carrier is directly connected to and operated by the movable mold having a mold cavity therein for shaping the article.

6 Claims, 14 Drawing Figures

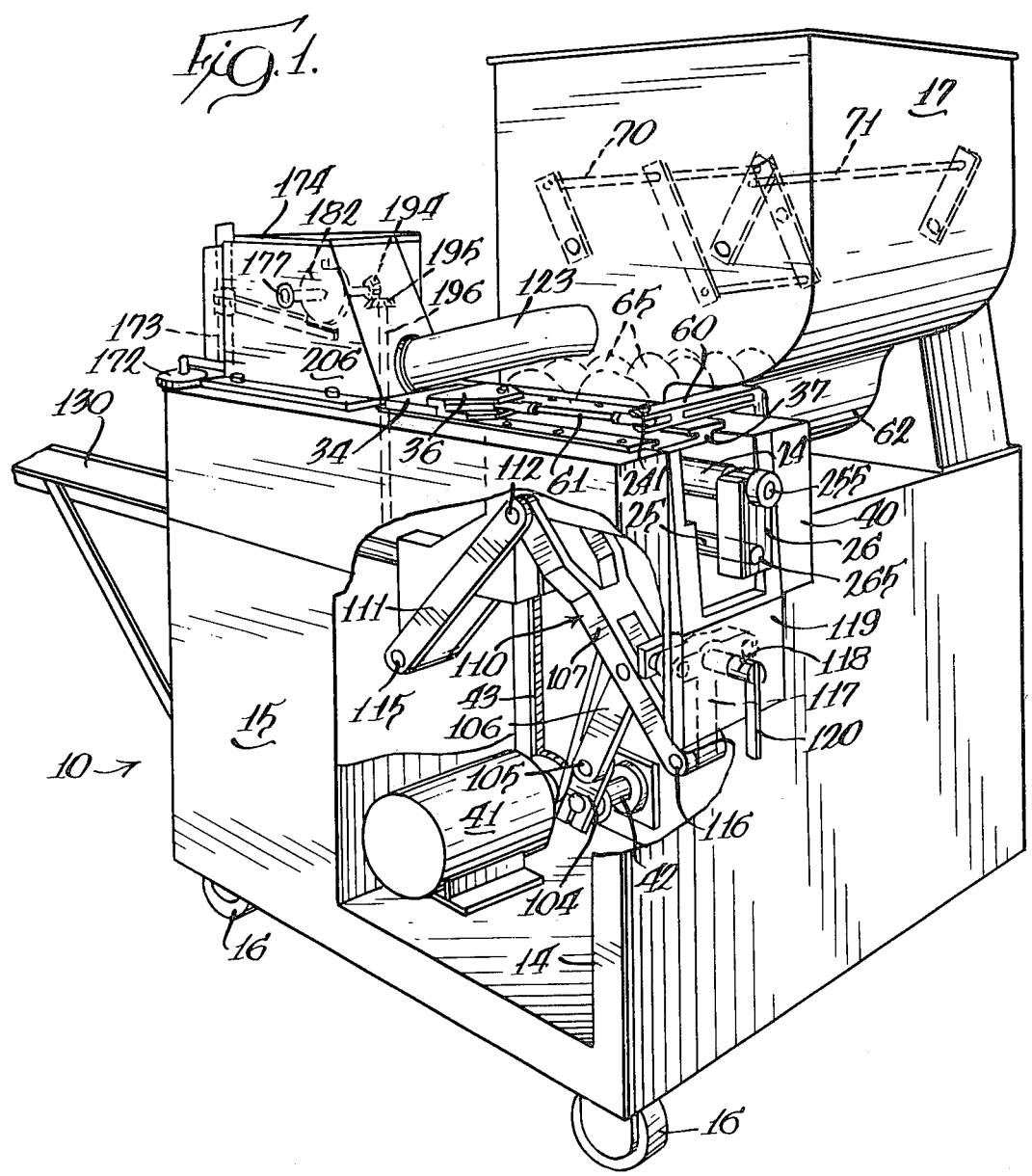

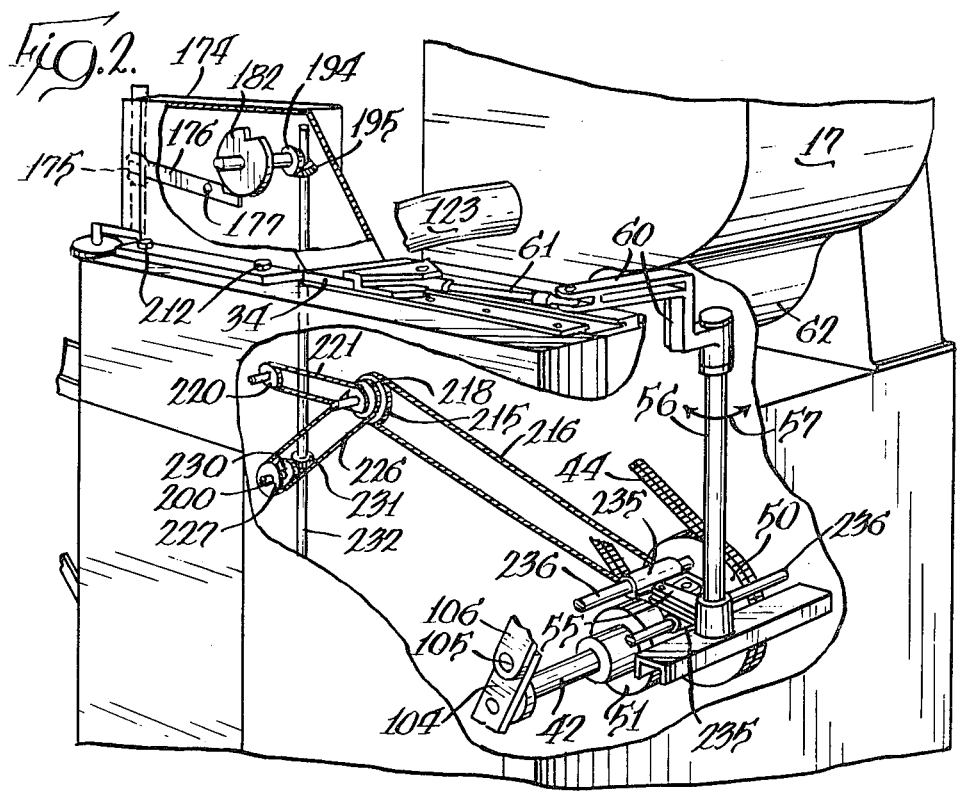
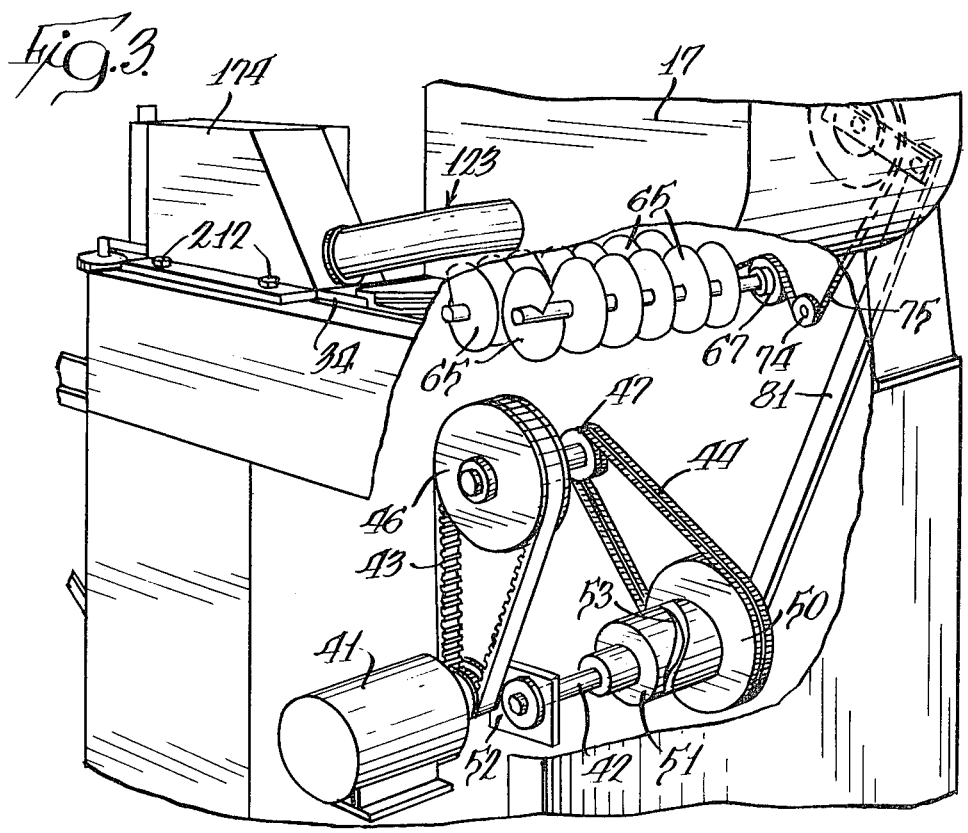

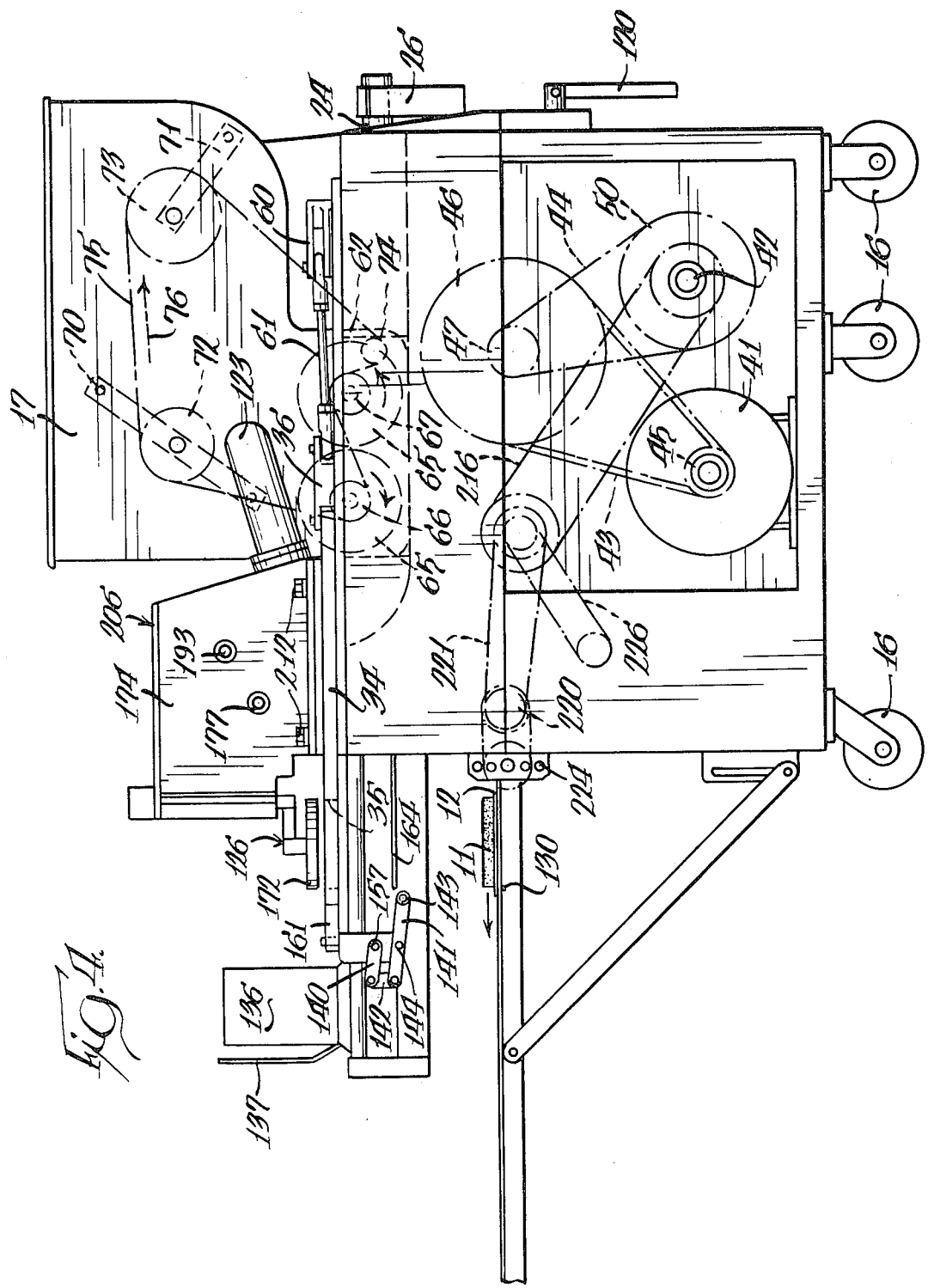

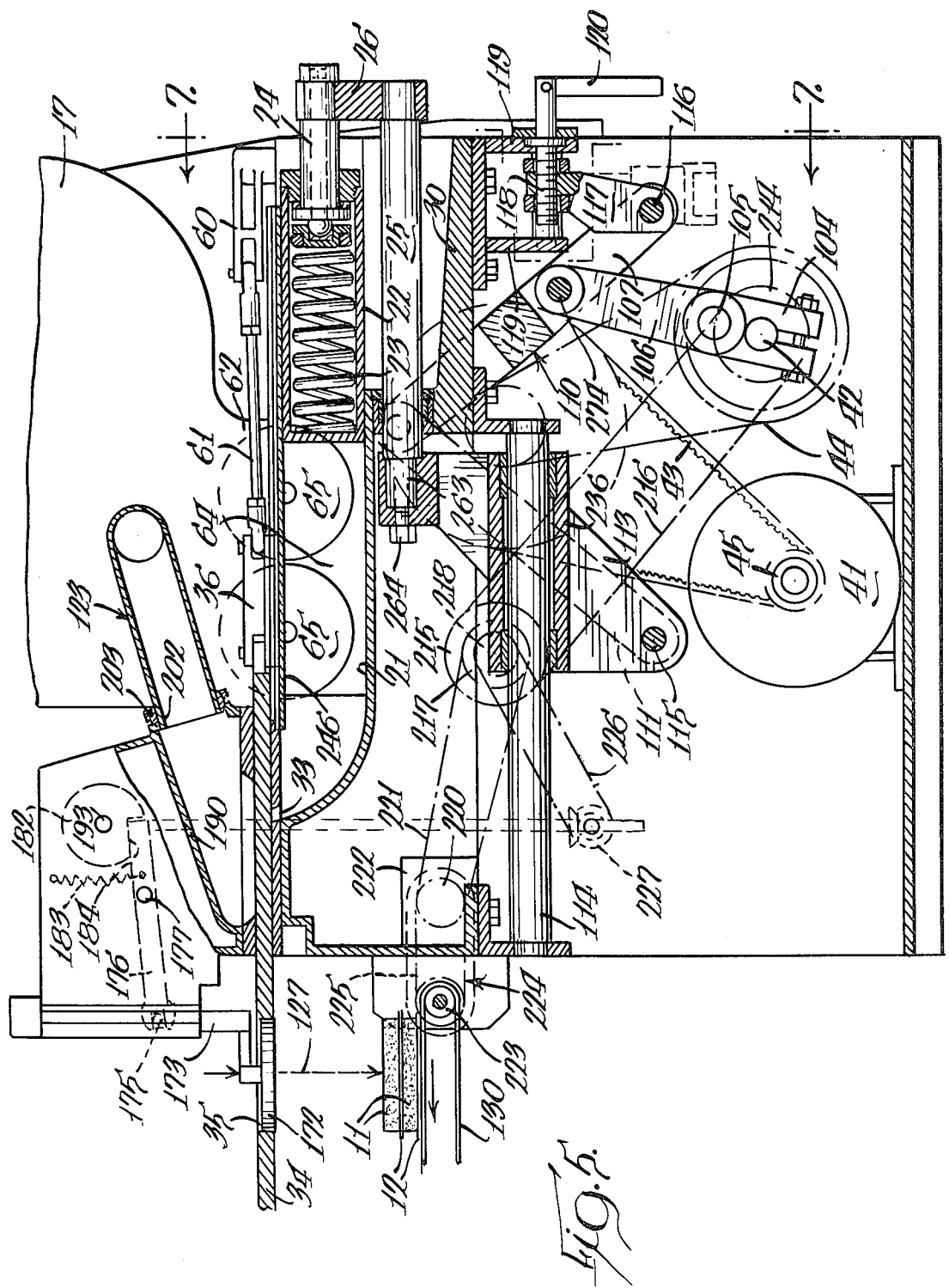

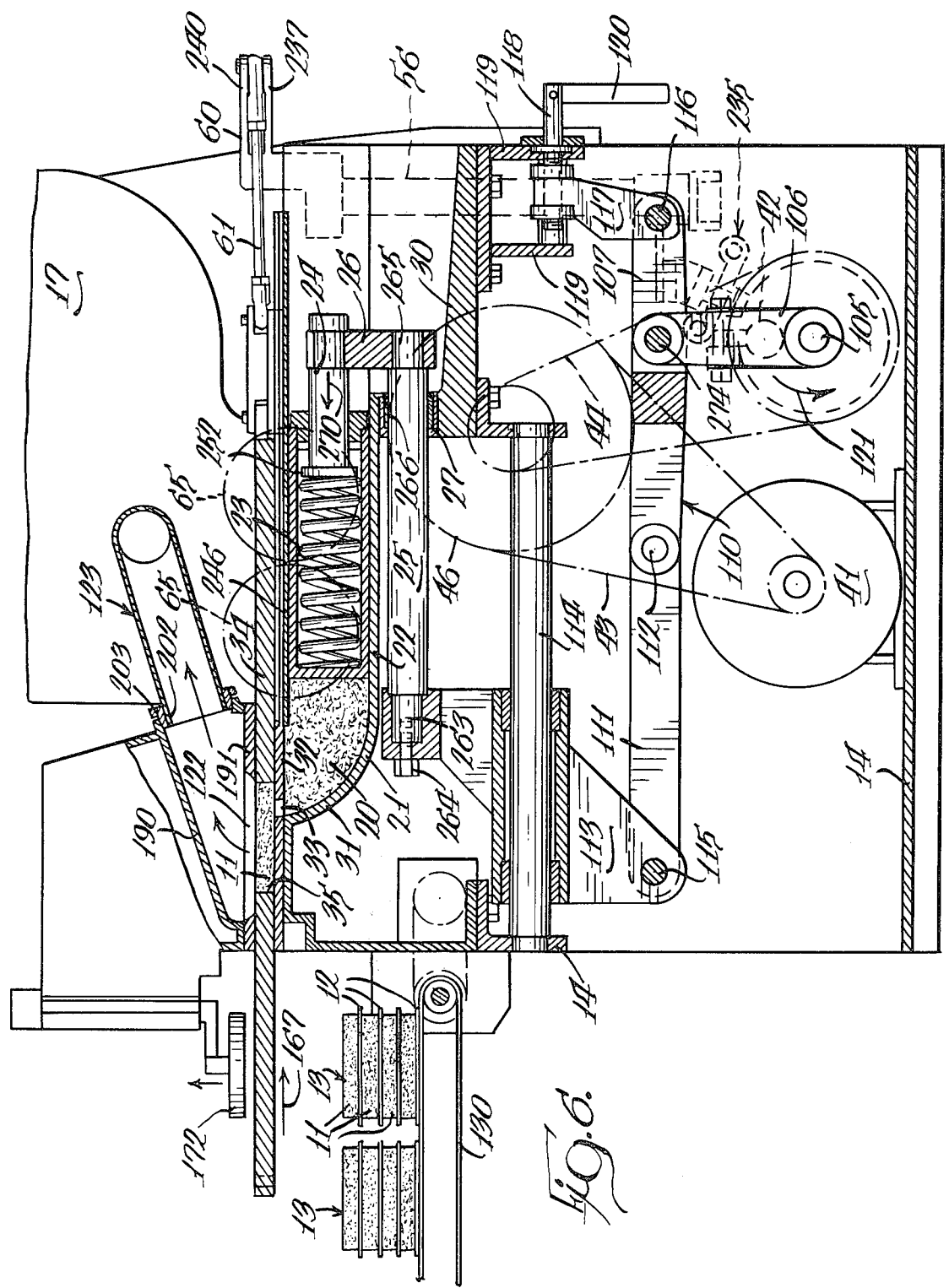

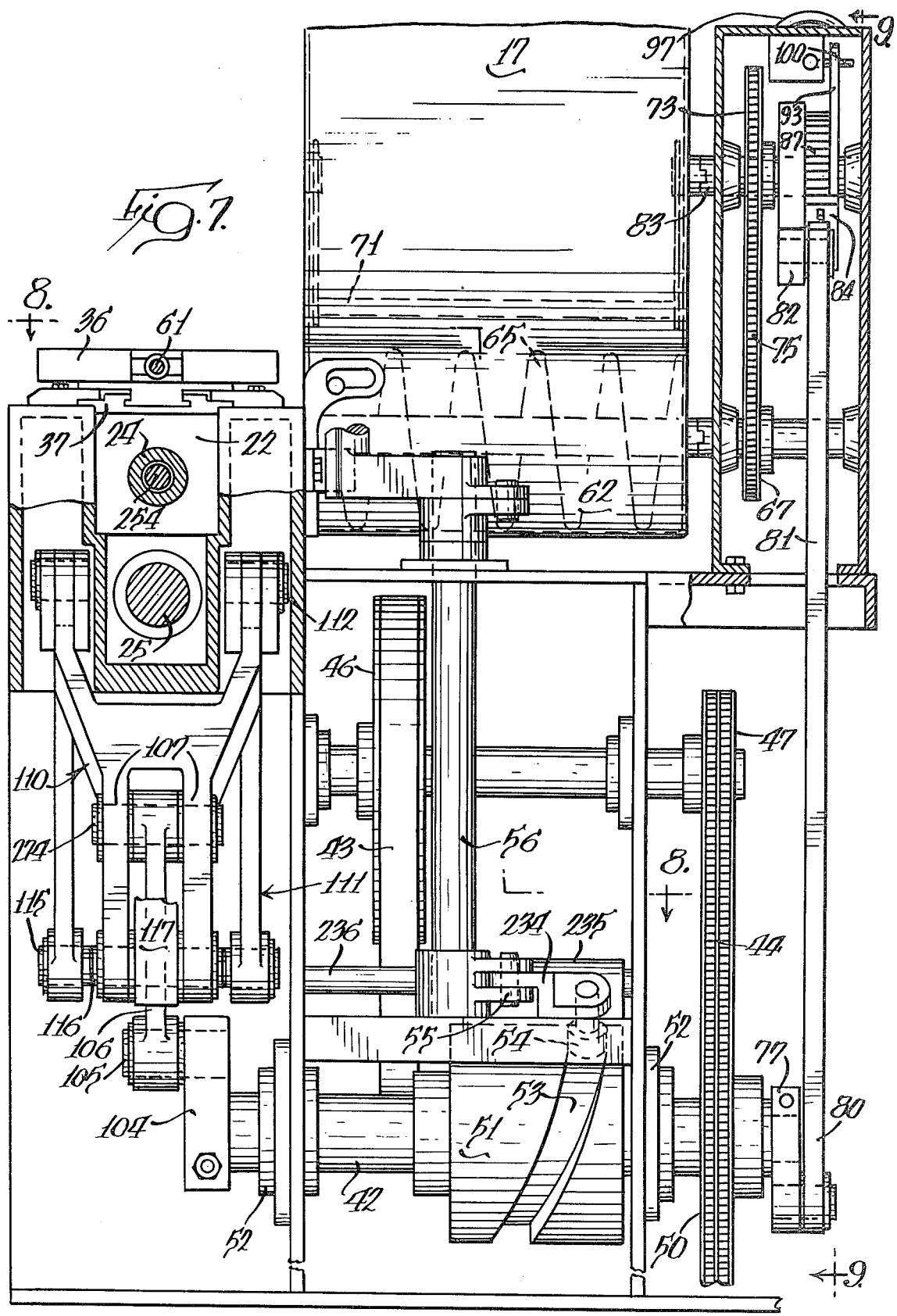

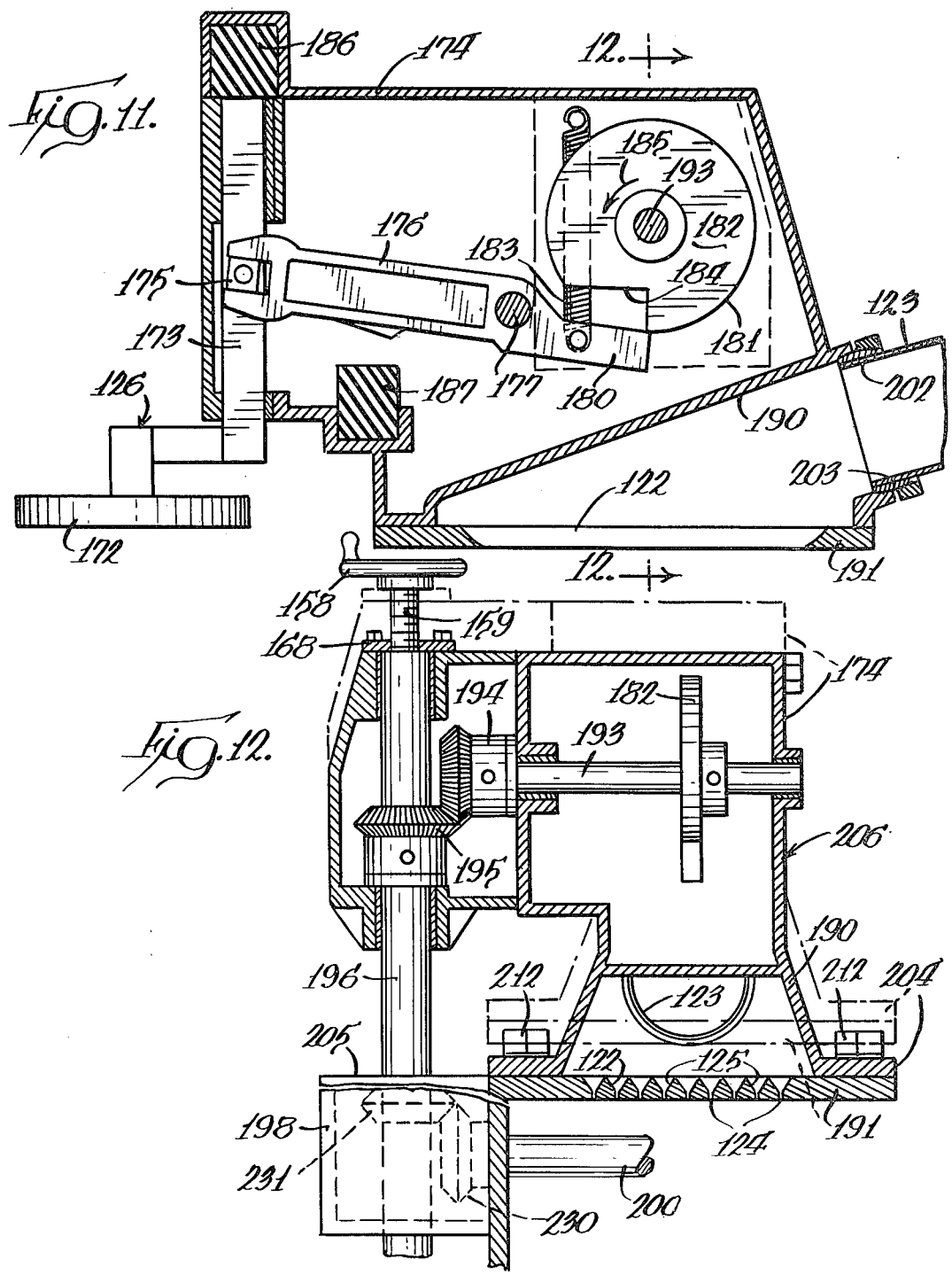

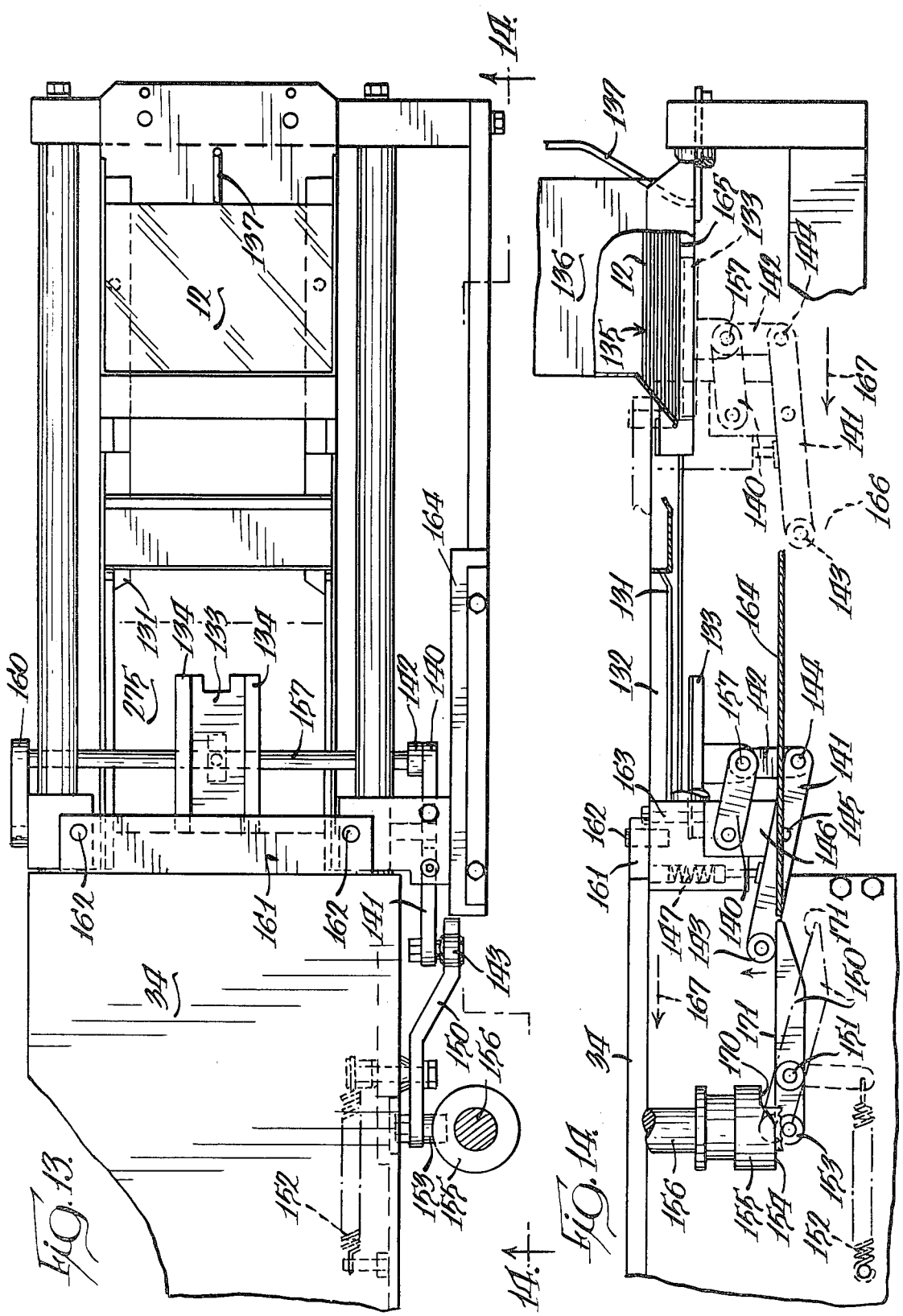

MOLDING APPARATUS WITH SHEET APPLICATOR

This is a division of application Ser. No. 86,761 filed Oct. 22, 1979 now U.S. Pat. No. 4,302,868.

SUMMARY OF THE INVENTION

This invention relates to a molding apparatus for molding articles such as patties from moldable material such as ground raw meat. One of the difficulties with such machines has been low productivity of articles per unit time and undesirably high noise pollution primarily because of the use of lost motion connections that permit a pause of one portion of the apparatus relative to another such as when injecting moldable material into a mold cavity, removing the molded article from the mold cavity and the like. The apparatus of this invention is remarkably quiet in operation as it avoids substantial lost motion connection between parts.

The apparatus of this invention provides a pressure chamber from which the meat is received directly from an extension of the hopper and from which the meat is pressure moved directly into a mold opening in a movable mold to shape the patties and from which the shaped patties are ejected at an external position of the mold. Thus in passing from the hopper to the pressure chamber the flow of the ground raw meat and the like is straight into the pressure chamber without requiring the meat to be directed around corners or other pathways of resistance to flow.

The apparatus of this invention also includes a dislodging or knockout device that enters the mold cavity and dislodges the article therefrom with this removal device being constructed of parts of minimum weight so that rapid acceleration and deceleration of the device is obtained at very low noise levels.

In order to separate one molded article from the next as in the stack of raw meat patties, the invention also includes an apparatus for applying separator sheets to the individual articles with this separator or paper sheet feed being of low profile so as to reduce the distance of fall of all patties in a stack, thereby reducing the time required to produce one or several patties in a stack.

In addition, the apparatus for applying the separator sheet to the individual articles comprises a paper conveying carrier movable between a supply of sheets and a spaced sheet retaining frame in which the carrier is directly connected to the mold plate to be removable therewith between the supply and the frame.

The articles such as patties are arranged in stacks of one or more on a movable carrier that collects the stacks and then moves them along to a place of handling such as packaging in which this carrier is driven directly from the motorized drive that operates the molding apparatus without requiring a separate motorized system as is customary in this art.

The apparatus of this invention has adjustable parts including adjusting the strokes of the meat supplying augers in the hopper and the length of stroke of the ram that forces the meat into the mold cavity with these adjustments being easily accomplished from the exterior of the apparatus or machine.

Another feature of the invention is to provide a method of molding patties from ground meat in which substantially only enough meat is fed into a pressure chamber from a hopper or supply of meat and this portion is then forced by a pressure means into a mold cavity to produce the patty.

The most pertinent prior art of which I am aware are U.S. Pat. Nos. 2,757,411; 3,137,029; 3,293,688; 3,312,997; 3,388,529; 3,526,924; 3,589,711; 3,747,160; 3,964,114 and 4,153,974, most of which are assigned to the assignee hereof. None of these prior art patents, however, disclose and claim the inventions that are disclosed and claimed herein.

BRIEF DESCRIPTION OF THE DRAWINGS

FIG. 1 is a perspective view of a molding apparatus embodying the invention in which successive flat patties of ground raw meat are molded at high speed and with precision, a portion of this Figure is broken away for clarity of illustration.

FIG. 2 is a fragmentary perspective view similar to a portion of FIG. 1 but further broken away to illustrate additional portions of the apparatus.

FIG. 3 is likewise similar to a portion of FIG. 1 but with still other parts broken away for clarity of illustration.

FIG. 4 is a side elevational view of the illustrated embodiment of the mold plate in extended position following removal of a patty from a patty shaped cavity in the mold plate.

FIG. 5 is a fragmentary longitudinal and vertical sectional view taken through the longitudinal center of the apparatus and showing the pressure ram in retracted position.

FIG. 6 is a view similar to FIG. 5 but illustrating the ram in extended position.

FIG. 7 is a vertical sectional view taken substantially along line 7—7 of FIG. 5.

FIG. 11 is a fragmentary vertical sectional view through the patty knockout portion of the apparatus of this invention.

FIG. 12 is a vertical sectional view taken substantially along line 12—12 of FIG. 11.

FIG. 13 is an enlarged plan view partially in section of the separator sheet applying portion of the apparatus taken from the left side of FIG. 4 but with the parts reversed 180° for clarity of illustration.

FIG. 14 is a fragmentary sectional view taken substantially along line 14—14 of FIG. 13.

DESCRIPTION OF THE PREFERRED EMBODIMENT

Figure 8:
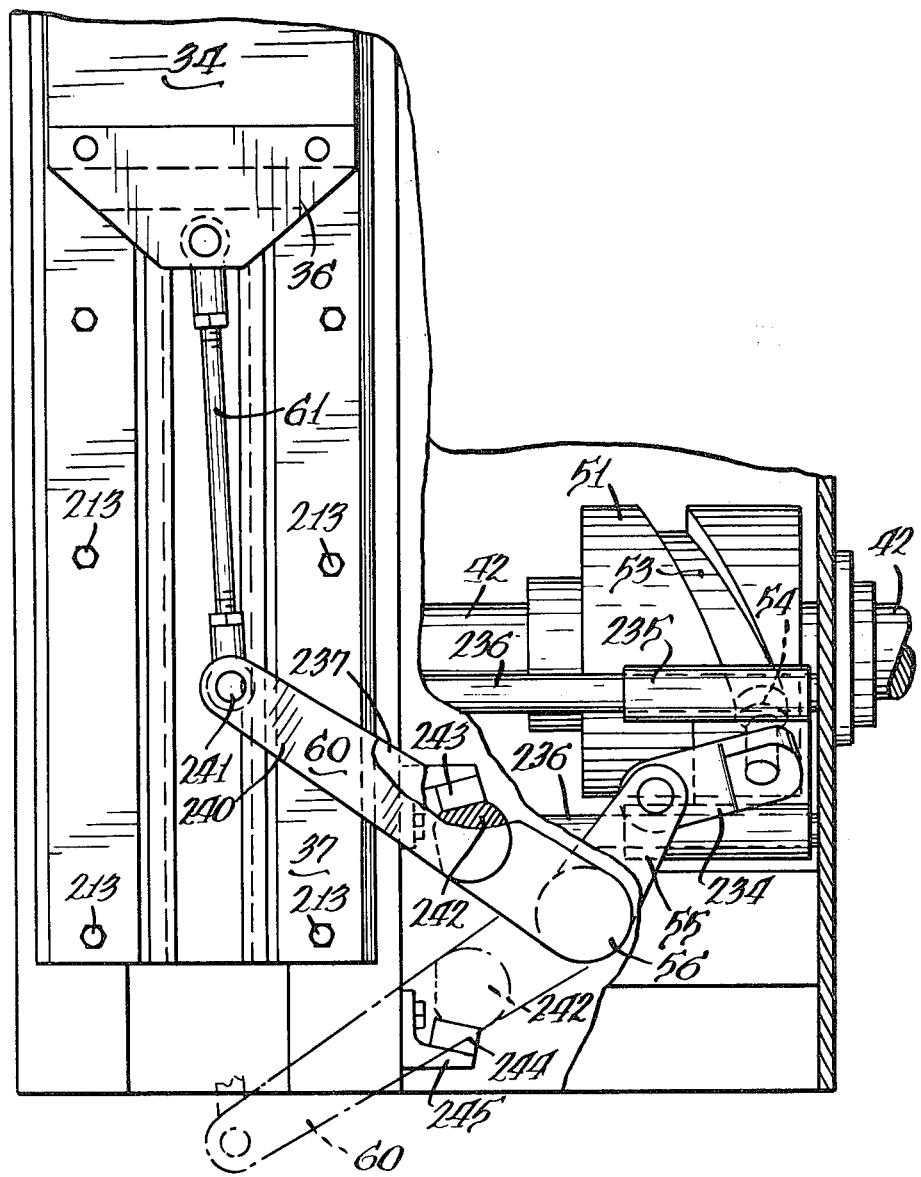
FIG. 8 is a sectional view taken substantially along line 8—8 of FIG. 7.

The embodiment shown in the above drawings is a molding apparatus 10 for molding a series of flat patties 11 of ground raw meat or the like each resting upon a paper separator sheet 12 for supporting each patty and separating it from the next patty, whether in stacks of one patty each as shown in FIG. 4 or of several patties each as illustrated by the two stacks 13 of four patties each as illustrated in FIG. 6.

The apparatus comprises a frame 14 enclosed by a thin sheet metal skin 15 and movably supported upon rollers 16 in the customary manner.

Supported on the frame 14 is a hopper 17 for retaining a supply of meat such as ground raw beef illustrated by the mass of ground meat 20 located in the pressure chamber 21 in front of the horizontally reciprocable pressure ram 22.

In order to limit the maximum pressure applied to the meat 20 in the pressure chamber 21 there is provided a helical compression spring 23 within the pressure ram 22 and a ram drive shaft 24 which in turn is attached to a ram drive bar 25 that is substantially parallel to the drive shaft 24 and connected to it by a yoke bar 26 with the drive bar 25 being located externally of the pressure chamber 21. The drive bar 25 is mounted in a bearing 27 which is located in a support part 30 of the frame 14. This bearing permits horizontal sliding movement of the drive bar 25 relative to the frame 30 and thereby horizontal movement of the pressure ram 22 by way of the ram drive shaft 24 and yoke bar 26.

Closing the top of the pressure chamber 21 at the upwardly curved front end 31 is a flat fill plate 32 containing a filling aperture 33 therein.

Positioned on the top of the fill plate 32 for horizontal sliding movement thereon is a mold plate 34 containing a patty shaped cavity 35 extending through the top and bottom surface. This mold plate 34 is attached at its rear end to a mold plate carriage 36 which is guided for horizontal movement in a track plate guide 37 that extends across the top sides of the frame 14.

Power is supplied to the apparatus 10 by an electric motor 41 which is mounted on the bottom of the frame 14. The motor in the illustrated embodiment operates at about 1200 rpm and rotates a drive shaft 42 at 66 rpm in this embodiment through a belt 43 and chain 44 by way of a series of pulleys 45, 46, and sprockets 47 and 50. As can be seen in FIG. 4, for example, the series of pulleys and sprockets 45-50 are arranged with the belt 43 and chain 44 to reduce the speed without requiring a gear speed reducer as is customary in patty machines of this type.

The drive shaft 42 (FIGS. 2 and 3) held in bearings 52 has mounted thereon a barrel cam 51 and sprocket 50 for rotation therewith by rotation of the sprocket 47 through the chain 44. The barrel cam 51 has a meandering endless cam track 53 that carries a cam follower 54 on the outer end of a radial arm 55 that extends from a vertical shaft 56 arcuately reciprocable about its vertical axis as indicated by the arrow 57 in FIG. 2. The radial cam operated arm 55 extends from the lower end of the vertical shaft 56 while the upper end of this shaft has projecting from it in a similar manner a radial arm 60 at whose outer end is hingedly connected a drive rod 61 whose other end is rotatably connected to the mold plate carriage 36.

Thus arcuate oscillation of the shaft 56 in the direction of the arrow 57 causes arcuate movement of the drive rod arm 60 and thereby longitudinal reciprocation of the mold plate carriage 36 and the mold plate 34 that is attached thereto.

The pressure chamber 21 receives ground meat or the like from the hopper 17 at a downwardly recessed portion 62 of the hopper bottom. This recessed portion extends down along one side of the hopper and is provided with a large, elongated, horizontal opening 64 leading to the pressure chamber 21. Meat is supplied to the pressure chamber 21 by a pair of transverse side-by-side augers 65. These augers carry on an adjacent end of each a sprocket 66 and 67. Also journalled in the hopper 17 at the upper area above the augers are a pair of rotatably mounted meat tumblers 70 and 71 each carrying a sprocket 72 and 73. These sprockets 66 and 67 and 72 and 73 and an idler sprocket 74 are connected by an endless drive chain 75. The chain is adapted to be moved in a clockwise direction as viewed in FIG. 4 and as indicated by the arrow 76 whereupon it rotates tumblers 70 and 71 in a clockwise direction and the augers 65 counter to each other to force meat through the elongated side opening 64 into the one side of the pressure chamber 21.

Figure 9:
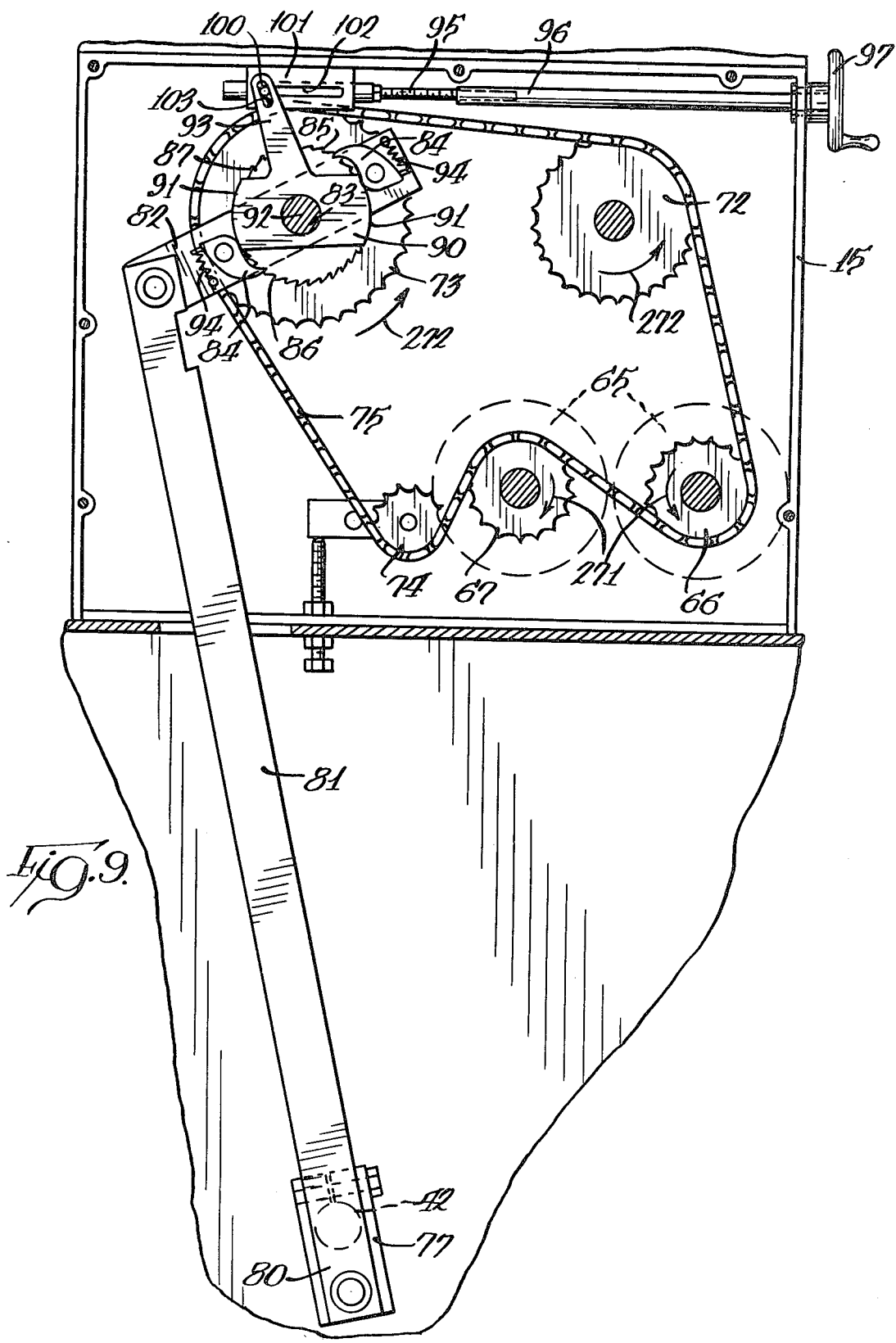
FIG. 9 is a fragmentary sectional view taken substantially along line 9—9 of FIG. 7.

The intermittent drive for the augers and thus of the tumblers 70 and 71 is illustrated in FIG. 9. As is shown here, the drive shaft 42 rotates a crank 77 that extends radially of the drive shaft 42 and has hingedly connected to one end thereof one end 80 of a drive bar 81. The opposite end of this drive bar 81 is hingedly connected to an arm 82 whose other end is rotatable about the adjacent tumbler 71 shaft 83.

The arm 82 extends on opposite sides of the tumbler shaft 83 and carries on these opposite sides pawls 84 that are located diametrically opposite each other. These pawls are each rotatably mounted on the arm 82 and are urged into engagement with peripheral ratchet teeth 85 and 86 that are adjacent to the pawl 84. The two diametrically opposite sets of ratchet teeth 85 and 86 are part of a circular plate 87 that is attached to the tumbler shaft 83 for rotation thereof. Also mounted on the shaft 83 but for rotation relative thereto is a pawl release plate 90 having arcuate peripheral surfaces 91. These surfaces 91 are concentric with the axis 92 of rotation of the tumbler shaft 83 as well as the release plate 90 and the plate is provided with an exiting arm 93 integral therewith.

Because of the rotation of the release plate 90 relative to the tumbler shaft 83 the plate 90 may be turned to various positions where the arcuate surfaces 91 will engage the pawls 84 and move them against the urging of their springs 94 away from and out of engagement with the ratchet teeth 85 and 86.

Therefore, depending upon the position of the release plate arm 93 which in turn determines the position of the plate 90 the spring urged pawls 84 are held out of engagement with any desired number of the ratchet teeth 85 and 86. This therefore determines the length of the increment of movement in each intermittent movement of the tumblers 70 and 71 and that meat feed augers 65.

In the illustrated embodiment the arm 93 and thus the pawl release plate 90 with which it is integral is determined by the position of a screw 95 threadedly engaging an elongated nut 96 that extends through the outer skin 15 of the machine so that this nut can be rotated by an external handle 97 to determine the relative position of the nut 95. This position of the nut 95 determines the position of a lateral pin 100 that is a part of the screw 95 at the inner end thereof which is held in a slidable holder 101. This pin 100 extends through a horizontal elongated slot 102 in the holder 101 engaging a longitudinal slot 103 in the arm 93.

The forward end of the drive shaft 42 carries a crank 104 rotatable therewith. This crank has one portion clamped to the shaft 42 as illustrated in FIG. 5 and the opposite end hingedly attached by a hinge pin 105 to a link 106 whose opposite end is attached to a first toggle linkage 107. The toggle 110 comprises two elongated linkages 107 and 111 hingedly connected at their ends around a pin 112. The opposite end of the second linkage 111 is hingedly attached to a carriage 113 that is slidable on a support rod 114 for movement in a horizontal path. The bottom end of this carriage 113 is connected to the toggle 110 while the top end is connected to the ram drive bar 25. This drive bar 25 is integrally connected to the ram drive shaft 24 through the yoke bar 26 as described above so that flexing of the toggle 110 about the hinge pin 112 and the hinge connection 115 on the carriage 113 between the positions shown in FIGS. 5 and 6 causes horizontal movement of the ram 22.

The end of the toggle 110 opposite to the carriage 113 is hingedly connected about a pin 116 and this pin 116 is mounted on a pivot part 117. In order to adjust the length of stroke of the ram 22 the pivot part 117 has a threaded opening therein substantially parallel to the ram 22 and this opening is engaged by a threaded rod 118 that is rotatably held in a mounting 119 so as to be turned by an external handle 120.

As can be seen by a comparison of FIGS. 5 and 6 rotation of the crank 104 in the direction 121 from the extreme retracted position of FIG. 5 to the extreme extended position of FIG. 6 causes reciprocation of the pressure ram 22 through its range of movement. The length of this range of movement or the forward movement of the ram 22 toward the filling aperture 33 is determined by the position of the pivot part 117 which in turn is determined by the adjustment of the threaded rod 118 by means of its operating handle 120. This occurs because the position of the pivot part 117 determines the rear position of the ram 22 which in turn determines the forward position of the ram.

As the ram 22 is moved forwardly to the position shown in FIG. 6 it of course forces meat 20 in front of it up through the aperture 33 into the patty shaped mold cavity 35. Air trapped in the empty cavity and meat products such as meat liquid and small particles of meat are forced upwardly through air release slots 122 and through a pipe 123 back into the hopper 17. These air release slots are described and claimed in my copending application Ser. No. 944,000, filed Sept. 30, 1978 and assigned to the assignee hereof. As shown in FIG. 12 these air release slots 122 have narrow entrances 124 and flaring exits 125.

FIGS. 13 and 14 illustrate the apparatus for applying a separator sheet 12 such as a sheet of oil impervious paper to each of the patties 11. By the operation of a knockout mechanism 126 to be described in detail hereinafter the patties are ejected from the mold cavity 35 in a path 127 and are collected on an endless conveyor belt 130 in stacks of one or more patties.

The apparatus for applying the separator sheets comprises a sheet retaining means including a frame 131 that defines an opening 132 in this path through which a patty falls as illustrated in FIG. 4 to pick up a paper sheet 12 from the frame.

In order to move a sheet into the frame which has sheet retaining means for releasably retaining the sheet to be engaged by the article or patty, there is provided a movable carrier 133 having spaced sheet engaging means comprising the friction straps 134 as shown in FIG. 13. The sheets 12 are held in a stack 135 comprising a supply of the sheets at the forward end of the apparatus beyond the extended position of the mold plate. This stack 135 is retained in a vertical holder 136 and the individual sheets 12 are perforated adjacent one edge and retained on an inclined pin at one edge of the sheets. Such a retaining means for a stack of sheets is disclosed in certain of the prior patents listed herein.

The movable carrier 133 is mounted for vertical movement on a pair of first 140 and second 141 hinged arms that are parallel to each other with the shorter arm 140 being directly hingedly connected to the bottom of the carrier 133 while the second longer arm 141 is connected to the first arm through a link 142 and has its opposite end provided with a roller weight 143.

The forward end of this second arm 141 is hingedly connected about a pin 144 to the link 142 and is fulcrumed about an intermediate pin 145 to a vertical strap 146. When the second or longer arm 141 is in elevated position as shown at the left side of FIG. 14 the arm 141 is turned in a clockwise direction about its pin 145 thereby retaining the carrier 133 in lowered position. The second arm 141 is constantly urged in a counterclockwise direction by a spring 147.

In order to retain the roller weight 143 of the arm 141 in elevated position there is provided a lever 150 that is vertically movable about a fulcrum 151. This lever 150 is constantly urged in a clockwise direction as viewed in FIG. 14 by a spring 152.

The spring 152 by urging the lever 150 in a clockwise direction as viewed in FIG. 14 about its fulcrum 151 holds a roller 153 on the end of the lever 150 against a cam surface 154. This cam surface is part of a cam 155 that is rotatable with a vertical rod 156 on which it is mounted.

By reason of the pin 144, link 142 and horizontal rod 157 mounting of the vertically movable carrier 133 the carrier is movable in a vertical path. The mounting rod 157 on which the carrier 133 is mounted has its end that is opposite to the hinged arm 141 carried by a hinge member 160.

In order to provide for movement of the carrier 133 between its extreme positions shown in full and broken lines in FIG. 14 the carrier is attached to the forward end 161 of the mold plate 34. This attachment is provided by the end 161 being connected by vertical pins 162 to a block 163 in which is located the spring 147 and on which is mounted the hinge arms 140 and 141 that comprise with the link 142 the movable mounting for the carrier 133.

At the frame 131 the carrier 133 is retained in lowered position as shown in solid lines by the raised lever 150 engaging the roller weight 143. Then, as the mold plate 34 is moved rearwardly the roller weight 143 moves from the elevated lever 150 onto a retention means horizontal flange 164 that is aligned with the top edge of the elevated lever 150. As the roller weight 143 rolls along the flange 164 the carrier 133 is retained in this lowered position.

When the mold plate 34 has been moved to the opposite end of its path of movement the roller weight 143 has rolled off the flange 164 because at this time the carrier 133 is beneath the lowermost sheet 165 in the stack 135 of sheets 12. Because the end 143 is no longer supported it is forced down by spring 147 as indicated by the arrow 166 to raise the carrier 133 into this sheet contact as shown in broken lines in FIG. 14.

Then on movement of the mold plate 34 to the filling position of FIG. 6, or in the direction as shown by the arrows 167 of FIGS. 6 and 14, the carrier 133 moves in the same direction to withdraw the lowermost sheet 165 from the bottom of the stack. During this movement toward the cavity filling position the roller 143, which is now in lowered position due to the force of spring 147, travels beneath the flange 164. At this time the rotation of the rod 156 and attached cam 155 has engaged the roller 153 with the recessed portion 170 of the cam 155 so as to hold the lever 150 in the lowered position shown in broken lines at the left end of FIG. 14.

In this position the approaching roller 143 engages the top surface 171 of the lever 150 so that continued rotation of the cam 155 causes the engagement of the roller 153 with the extended cam surface 154 to again raise the hinged arm 141 to the elevated position shown at the left of FIG. 14.

Because at this time the movement of the carrier 133 has placed the paper sheet 12 in the retaining frame 131 the lowering of the carrier 133 deposits the sheet in the frame to be picked up by a patty 11 falling from the shaping cavity 35 in the mold plate 34.

In order to dislodge the patties 11 from the mold cavity 35 when the mold is in extended position as illustrated in FIG. 5, there is provided a knockout cup 172 mounted on the lower end of a vertically movable arm 173. This vertical arm 173 is movably mounted in a housing 174 and is hingedly connected by means of a hinge member 175 to a cam follower arm 176 that is arcuately movable about a fulcrum 177.

The opposite end 180 of this arm 176 comprises a cam follower and is held in engagement with the periphery 181 of a rotatable circular cam 182 by means of a spring 183. This circular cam 181 has a right angled notched part 184 so that when the cam follower end 180 of the arm 176 is in this notch, as illustrated in broken lines in FIG. 5, the knockout cup 172 is in its lowermost position to dislodge a patty 11 from the mold cavity 35. Then, further rotation of the cam 182 in the direction 185 indicated causes the arm 176 to be rotated in a clockwise direction as viewed in the drawings to lift the cup 172 from the mold cavity 35.

The operating parts of the patty removal device including the cup 172, mounting arm 173, hinge member 175 and fulcrumed cam follower arm 176 are all made of lightweight metal parts so that movement into and back out of the mold cavity 35 between the extreme positions shown in FIGS. 5 and 11 is rapid and sharp. As a further aid in reducing the noise level, resilient bumpers 186 and 187 made of resilient rubber or the like are provided held by the housing 174 to be engaged by the mounting arm 173 and cam follower arm 176 at the extreme ends of their paths of movement. These bumpers combined with the low mass of the above-mentioned parts 172, 173, 175 and 176 are quite important in reducing the noise level.

As can be seen in the drawings, and particularly in FIGS. 1–6, it is necessary to raise the air vent chamber 190, air release plate 191 that is attached thereto, vent pipe 123, knockout housing 174, all of which comprise the movable unit 206, in order to provide access to the mold plate 34, for cleaning, replacement of a different sized mold plate or any other reason.

In order to achieve this raising the top of the housing 174 opposite the upper end of the vertical shaft 196 is provided with a plate 168 having a threaded opening into which extends a vertical threaded bolt 159 coaxial with the vertical shaft 196 to bear against the upper end of the shaft 196. The upper end of this vertical bolt 159 is provided with a hand wheel 158 (FIG. 12). Then when it is required to replace or remove the mold plate it is only necessary to turn the hand wheel 158 to screw the bolt 159 downwardly and the action of the lower end of this bolt 159 against the upper end of the vertical shaft 196 lifts the entire unit 206 to an elevated position as indicated by the broken lines in FIG. 12.

When elevated the flange 204 surrounding the chamber 190 and the air release plate 191 leave the top of the mold plate 34 as shown in broken lines and the bevel gear 231 remains in contact with the gear 230.

When in this elevated position the entire unit 206 that includes the housing 174 and all the above listed parts contained therein can then be swung to one side about a pivot formed by the engagement of the lower end 210 of the vertical shaft 196 with the bottom 211 of the gear housing 198. Once the unit 206 is back in position as shown the bolts 212 are reattached to hold the unit 206 in position.

The drive shaft 42 as shown in FIGS. 2–5 rotates a sprocket 214 which drives a sprocket 215 by means of an endless chain 216. The sprocket 215 has two smaller sprockets 217 and 218 concentric therewith and driven thereby. The sprocket 217 rotates a further pulley 220 by means of an endless chain 221. The sprocket 220 operates through an electric clutch 222 to rotate a sprocket 223 when this electric clutch is energized in the usual manner.

The sprocket 223 is held in a structure 224 on the exterior of the apparatus and is driven from the sprocket 220 of the clutch 222 by means of a chain 225. This sprocket 223 engages and drives the patty receiving belt 130 when the clutch 222 is energized. This driving of the patty receiving belt 130 is in increments with each increment of movement being equal to the spacing between adjacent stacks 13 of patties 11 as illustrated in FIG. 6. This spacing will of course be between individual successive patties if the timing mechanism (not shown) is set so as to limit each stack to a single patty.

The sprocket 218 that is rotated by the chain 216 driving the sprocket 215 drives an endless chain 226 which rotates a sprocket 227. The sprocket 227 mounted on shaft 200 rotates a bevel gear 230 which is in engagement with another bevel gear 231 at right angles to it and this gear 231 is attached to a vertical shaft 232 for rotation of this shaft. The upper end of shaft 232 through a set of bevel gears 194 and 195 drives the horizontal shaft 193 (FIG. 12) which in turn rotates the knockout cam 182.

As shown in FIG. 8, the radial drive arm 55 is hingedly connected at its inner end which extends beyond the oscillatable shaft 56 to a link 234 whose inner end carries a cam follower 54 that engages the cam track 53 on the rotatable barrel cam 51. This cam follower 54 is attached to a carriage 235 that slides on guide rods 236 that extend transversely of the path of travel of the mold plate 34.

The arcuately reciprocable arm 55 that is attached to the vertical shaft 56 for arcuate movement therewith comprises a pair of parallel arms 237 and 240 that are connected at an area intermediate the shaft 56 and the hinge connection 241 of the drive rod 61 to the arm 55. In order to determine the ends of the arcuate movement of the arm 55, and thus the position of the mold plate, between the solid line position and the dotted line position of FIG. 8 there are provided resilient bumpers 243 and 244, such as resilient rubber, each mounted on a mounting bracket 245. These also have the added function of cushioning noise.

Figure 10:
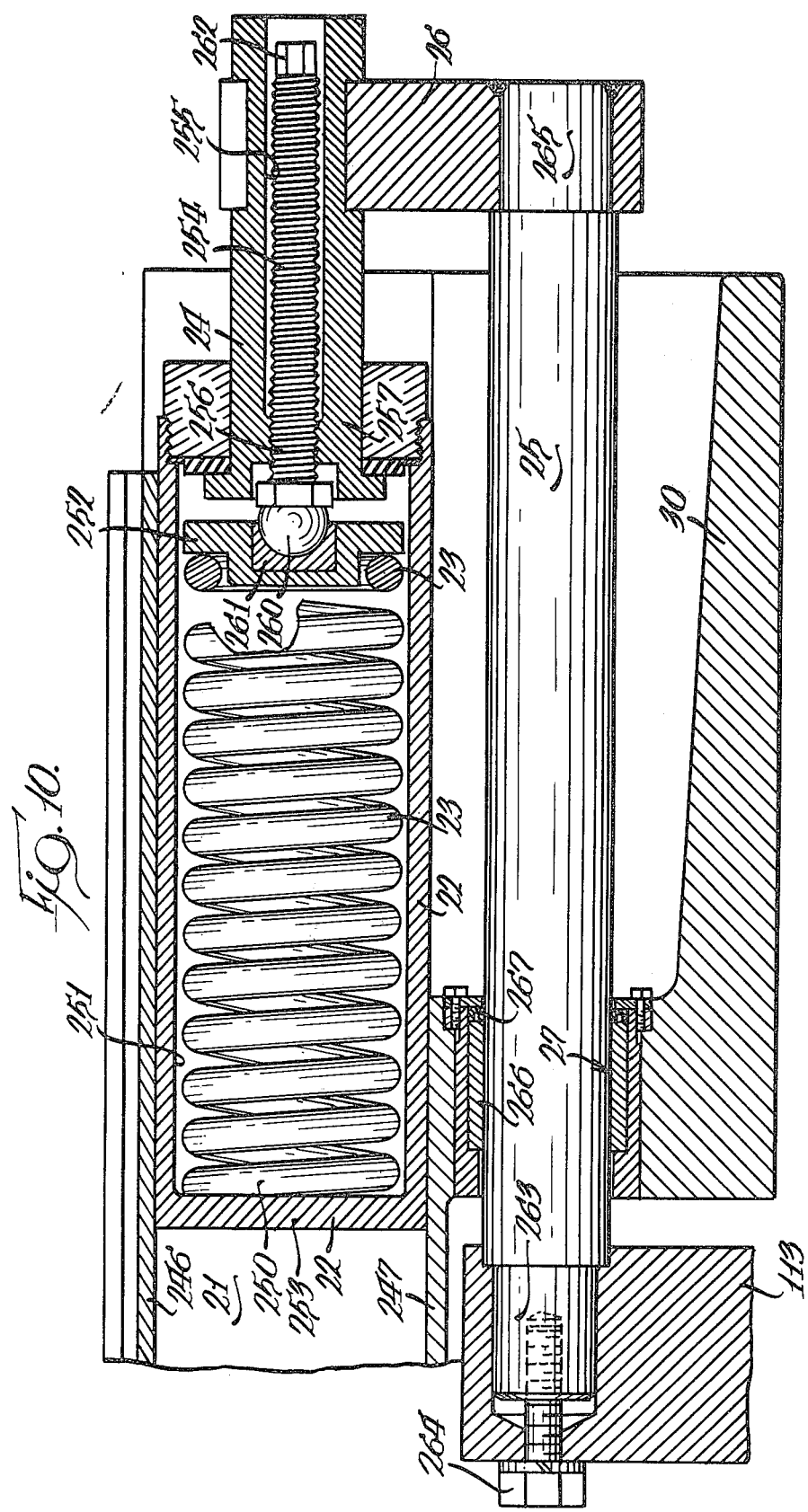
FIG. 10 is an enlarged sectional view of a portion of the section of FIG. 5.

FIG. 10 shows in section the details of the pressure ram 22 and associated structure. As is shown in FIG. 10 the ram 22 slides between the parallel top and bottom walls 246 and 247 defining the pressure chamber 21. The top wall 246 is joined to the fill plate 32 as is illustrated in FIG. 6.

The compression spring 23 as shown in FIG. 10 abuts at its front end 250 against the inner surface of the end of the ram 22 as the spring is retained within a hollow chamber 251 within the ram. In order to adjust the precompression on the spring 23 the rear end of the spring abuts against a stop plate 252 which is adjustably positioned relative to the front wall 253 of the ram 22. This adjusting of the position of the stop plate 252 relative to the front wall 253 determines the precompression on the spring 23 and thus its effective length.

The positioning of the stop plate 252 is easily achieved by means of the threaded bolt 254 that extends through the hollow axial interior 255 of the ram drive shaft 24. The inner end 256 of this threaded bolt engages similar threads on the inner end 257 of the ram drive shaft 24. This bolt inner end 256 carries a ball-shaped axial member 260 that engages a bearing member 261 on the central part of the stop plate 252. The outer end of this threaded bolt 254 opposite to the member 260 is shaped as a nut 262 exposed through the outer end of the hollow interior 255 so as to be readily accessible for engagement with a correspondingly shaped tool for rotating the bolt 254 to adjust the precompression on the spring 23.

Also as shown in FIG. 10, the inner end 263 of the drive bar 25 extends into the carriage 113 and is attached thereto by a bolt 264. The outer end 265 of the ram drive bar 25 is attached to the yoke bar 26 as by welding. The carriage 113 when reciprocated in a horizontal path in the manner previously described is guided by the engagement of the ram drive bar 25 in a bearing 266 provided with an oil seal.

The Operation of the Illustrated Embodiment

Prior to the operation of the machine the proper size of mold plate 34 is selected and installed for the desired mold cavity 35 size in order that the patties 11 will be of a preselected weight. Thus in one embodiment of the invention mold plates were available to produce patties 11 from one ounce to fourteen ounces in size. With the installation of the mold plate 34 to make the desired size patty, the stroke of the pressure ram 22 is adjusted so that this stroke is only sufficient to force the required amount of meat from the supply 20 in front of the ram 22 into the mold cavity 35 through the fill slot 33. Thus for small patties the length of the stroke 270 of the ram 22 will be shorter while for larger patties it will of course be longer.

This adjustment of the length of stroke of the ram 22 is accomplished by means of the movable pivot part 117 to which one end of the toggle unit 110 is hingedly attached by the pin 116. Because the toggle 110 has a fixed length between the end pivot pins 115 and 116 any movement of the pivot part 117 to the right or left as viewed in FIG. 6 will shorten or lengthen, respectively, the length of stroke of the carriage 113 to which the ram 22 is attached by means of the drive shaft 24, yoke bar 26 and ram drive bar 25.

In order that only enough meat 20 will be supplied to the front end 31 of the pressure chamber 21 to provide for filling the mold cavity 35 the distance of rotational movement 271 of the augers 65 is similarly indexed to supply only this amount. The indexing feature for the augers is illustrated most clearly in FIG. 9. This variable indexing for the augers is accomplished by adjusting the position of the handle 97 which extends to the exterior of the apparatus 10 and which when turned moves the screw part 95 longitudinally or to the right or left as viewed in FIG. 9 because of the threaded engagement of this screw 95 to the threaded interior at the end of the elongated nut 96.

As the screw 95 is moved it also moves the pawl release plate 90 about its axis 92 due to the engagement of the arm 93 on the plate 90 with a pin 100 that is carried by the screw 95 and extends laterally therefrom through the elongated slot 102 to engage a radial slot 103 in the arm 93.

As the position of the plate 90 is changed the two diametrically opposite peripheral and coaxial surfaces 91 on the plate 90 overlie varying numbers of the ratchet teeth 85 and 86 on opposite sides of the ratchet plate 87 on which the plate 90 overlies.

The purpose of this is that as more of these plates are blocked from engagement with the diametrically opposite pawls 84 the incremental movement of the ratchet plate 87 is increased or decreased.

When the pawl release plate 90 at the peripheral surfaces 91 overlies all but a very few of the ratchet teeth 85 and 86 the degree of movement of the tumblers 70 and 71 in the direction 272 will be quite small. When, on the other hand, large numbers of the ratchet teeth 85 and 86 are exposed as in the FIG. 9 illustration the pawls 84 will take a larger "bite" of the teeth 85 and 86 so that the distance of movement 272 will be much greater. The way in which these pawls 84 and thereby the ratchet plate 87 and the tumblers 70 and 71 are incrementally moved will be described in detail hereinafter.

The indexing of the amount of movement of the ratchet plate 87 as described also indexes a corresponding movement of the cooperating augers 65 due to the provision of the drive chain 75 interconnecting the sprockets 66, 67, 72, 73 and 74 that are mounted on the augers 65 and the tumblers 70 and 71, respectively.

Thus the sprocket indexing handle 97 is adjusted simultaneously with the pressure ram indexing handle 120 to supply only enough meat to the pressure chamber 21 to fill the mold cavity 35 and to index the length 270 of stroke of the pressure ram 22 to force only this amount of meat into the cavity 35. It is, of course, true that the front of the ram 22 always bears against a mass of meat 20 in the front end of the pressure chamber 21 but as this meat is used up to form the patties 11 in the mold cavity 35 an equal amount of meat is supplied by the incremental rotational movement of the augers 65.

Then because the augers 65 do not fill the opening 64 between the hopper 17 and the pressure chamber 21 the augers when stationary block substantial reverse flow of meat into the hopper 17 even when the pressure on the meat in the pressure chamber is considerably increased by the ram 22. There is enough reverse flow past the stationary augers 65 to serve as a pressure relief to prevent excessive pressure on the meat.

With the desired mold plate 34 installed in the molding apparatus and with the indexing handles 120 for the preselected degree of movement of the ram 22 and the handle 97 for the desired incremental rotational movement of the augers 65 properly set the electric motor 41 is energized.

With the parts in the position shown in FIG. 5, the crank 104 on the drive shaft 42 is aligned with the link 106 and thereby holds the first 107 and second 111 toggle linkages of the toggle 110 in elevated position by reason of the hinged connection of the drive link 106 to the crank 104 by means of the end hinge pins 105 and 274.

This elevated position of the toggle 10 moves the carriage 113 its furthest distance to the right as shown in FIG. 5. This retains the pressure ram 22 in retracted position.

At the same time the mold plate 34 has just been moved to its furthest extended position and the patty knockout cup 172 has been snapped down into the mold cavity 35 to dislodge the last patty 11 therefrom by reason of the spring 183 and the cam follower arm 176 which is now in engagement with the notch 184 in the rotary cam 182.

Because of the curvature of the cam track 53 on barrel cam 51 and the phase relationship to link 104 (FIG. 7) and the relationship to drive link 106 at this extreme end of movement, there is a momentary pause in the retraction of the ram 22 and the movement of the mold plate 34. This gives time for the knockout cup to be snapped into the mold cavity 35 by the spring 184 and then raised therefrom prior to any substantial movement of the mold plate 34.

It is an important feature of this invention that this pause in movement of the mold plate 34 and of the ram 22 is obtained without the use of any noise producing lost motion connections.

Continued counterclockwise movement 121 of the drive shaft 42 as viewed in FIGS. 4 and 5 from the position shown in FIG. 5 causes rotation of the knockout cam 182 (FIGS. 11 and 12) to lift the knockout cup 172 from the mold cavity 35. This also causes retraction of the mold plate 34 to the filling position of FIG. 6.

The augers 65 begin moving when the ram is approximately halfway back to its retracted position of FIG. 5 and auger movement continues until the ram is fully retracted. This movement of the augers also continues during the forward movement of the ram from the position of FIG. 5 toward the position of FIG. 6. However, the augers stop rotating when the ram is approximately half the distance of its forward movement. Thus for approximately the latter half of the forward movement of the ram to force the meat into the patty shaped mold cavity 35 the augers are stationary. The stopped augers thereby serve to block partially reverse flow of meat through the elongated opening 64. Because the stopped augers do not completely block the elongated opening 64 in the side of the pressure chamber, as can be seen in FIG. 5, the stopped augers comprise a pressure limiting factor in that some of the meat in front of the advancing ram, in excess of that required to fill the mold cavity, can escape back into the hopper 17 between the bottom portions of the augers 65.

Although the illustrative embodiment shows only a single mold cavity in the mold plate for making one patty at a time, the apparatus of this invention can be used to make multiple patties, at the same time, by providing a multi-cavity mold plate.

The maximum pressure of the ram on the meat 20 in front of the ram and within the pressure chamber is further limited by the yieldable compression spring 23 on the interior of the ram 22. The compression of this spring 23, and thus the maximum pressure that can be exerted on the meat 20, can be adjustably preselected by the position of the stop plate 252 against which the rear end of the spring 23 bears. This stop plate 252 is adjusted in position with respect to the inner end 257 of the ram drive shaft 224 (FIG. 10) by the rotatable bolt 254. This degree of precompression of the spring 23 is thus easily variable by rotating the bolt 254 by means of its externally exposed nut end 262.

Continued rotation 121 of the drive shaft 142 causes the crank 104 to lift the toggle 110 toward the raised position of FIG. 5 through the link 106 that is movably attached at the pin 105 and the pin 274 to the crank and the first toggle linkage 107, respectively. During this upward movement of the toggle 110 the ram 22 is retracted from the position of FIG. 6 to the position of FIG. 5 by reason of the carriage 113 and its connection to the ram by way of the elements 24, 25 and 26.

At the same time the mold plate 34 is moved in the opposite direction from the retraction movement of the ram 22 by reason of the rotation of the barrel cam 51 with the drive shaft 42 to which it is attached. This rotation of the barrel cam causes the engagement of the cam track 53 to the cam follower 54 to move the radial arm 60 from the solid line position to the dotted line position in FIG. 8. These are the two extreme positions of the arm 60 and thus of the mold plate 34 to which it is attached by way of the drive rod 61 and carriage 36.

This retraction movement of the mold plate 34 of course occurs after the knockout cup 172 has been lifted from the mold cavity 35 by means of the fulcrumed cam follower arm 176 and the rotary cam 182.

The continued movement of the radial arm 60 from its extended position of FIG. 8 returns the mold to its retracted position where the cavity 35 is again in communication with the fill aperture 33 so that the cavity can again be filled with meat in the manner illustrated in FIG. 6.

Thus the movement of the mold plate 34 from the fill position of FIG. 6 to the extended patty removal position of FIG. 5 and back again to the position of FIG. 6 constitutes one cycle of operation and produces one patty 11. During this one cycle of operation the cam follower arm 176 moves through its cycle which is from the raised position of FIG. 11 where the knockout cup 172 is clear of the mold cavity 35 to the down position of FIG. 5 where the spring 183 has snapped the cup 172 into the aperture 35 to dislodge the patty therefrom. Each end of this path of vertical movement of the knockout cup 172 is defined by the resilient sound deadening bumpers 186 and 187.

In order that the stacked patties 11 when deposited in stacks of a plurality of patties each will not stick to each other a separator sheet 12 is applied to each patty. This separator sheet may be of the customary non-adherent paper that is used widely in this industry. The apparatus for applying the separator sheet to each of the series of molded articles embodied in the individual patties 11 is illustrated most clearly in FIGS. 13 and 14. Thus this apparatus is illustrated in conjunction with the movable mold plate 34 having the shaping cavity 35 and comprises sheet retaining means including the frame 131. This frame defines an opening 275 in the path of fall of the ejected patty 11 with this path being illustrated by the vertical arrow 127 in FIG. 5. For clarity of illustration FIGS. 5 and 6 omit the separator sheet applying apparatus and this apparatus is illustrated in conjunction with the patty machine in the remaining combination figures and is illustrated in detail in FIGS. 13 and 14.

The separator sheet is placed in the support frame 131 by the four motion movable carrier 133 that is attached to the mold plate 34 by the pins 162 to be movable therewith. The structure and operation of this portion of the apparatus has been previously described.

Various features of the molding apparatus are covered by earlier patents to the same assignee in the list of prior art patents given earlier.

The molding apparatus including the separator sheet applying portion is efficient and fast in producing molded articles as illustrated by the hamburger patties and is remarkably silent in operation by using a patty knockout structure of low mass, by avoiding lost motion connections which are inherently noisy and by cushioning the patty knockout structure 126 at each end of its path of movement.

The avoidance of lost motion connections, yet providing the necessary pauses for filling the mold cavity 35 at the position illustrated in FIG. 6 and removing the patty from the cavity at the position of FIG. 5 is brought about by the toggle 110 which provides sufficient pause for these actions at each end of its range of movement which is the aligned position of the two toggle links 107 and 111 as shown in FIG. 6 and the extreme elevated position of the toggle as illustrated in FIG. 5.

Having described my invention as related to the embodiment set out in the accompanying drawings, it is my intention that the invention be not limited by any of the details of description, unless otherwise specified, but rather be construed broadly within its spirit and scope as set out in the appended claims.

I claim:

1. Apparatus for applying a separator sheet to each of a series of molded articles ejected in a path from a molding apparatus, comprising: a movable mold having a mold cavity for shaping a said article from a moldable material; moving means for moving said mold between a first position where said cavity receives said material to shape said article and a second position where said molded article is ejected from said cavity in said path; a sheet retaining means including a frame defining an opening in said path through which said article passes upon said ejecting, said frame having sheet retaining means for releasably retaining said sheet in said frame opening to be engaged by said article; holding means spaced from said frame for releasably holding a supply of said sheets; a movable carrier having sheet engaging means thereon and movable between said holding means and said sheet retaining means, said sheet engaging means including means for engaging and moving sheets in series from said supply into said frame; and means for directly connecting said carrier to said mold for movement of said carrier between said holding means and said sheet retaining means and back again simultaneously with said movement of said mold between said first and second positions.

2. The apparatus of claim 1 wherein there are provided mounting means for said carrier on said mold, said carrier being located beneath said stack of sheets when said mold is in said extended position and at said frame when said mold is in said retracted position, means for raising said carrier beneath said stack to engage said end sheet when said mold is in said extended position, and means for lowering said carrier to deposit a sheet thereon in said frame when said mold is in said retracted position.

3. Apparatus for applying a separator sheet to each of a series of molded articles ejected in a path from a molding apparatus, comprising:
a movable mold having a mold cavity for shaping a said article from a moldable material;
moving means for moving said mold between a first position where said cavity receives said material to shape said article and a second position over said frame where said molded article is ejected from said cavity in said path;
a sheet retaining means including a frame defining an opening in said path through which said article passes upon said ejecting, said frame having sheet retaining means for releasably retaining said sheet in said frame opening to be engaged by said article;
holding means spaced from said frame for releasably holding a supply of said sheets;
a movable carrier having sheet engaging means thereon and movable between said holding means and said sheet retaining means, said sheet engaging means including means for engaging and moving sheets in series from said supply into said frame;
means mounting said carrier for essentially vertical movement for engaging a bottom sheet of said supply of sheets which comprises a vertical stack means with the bottom sheet exposed to said carrier;
means between said holding means and said sheet retaining means for retaining the carrier in elevated position during its travel to said frame; and
means for lowering said carrier at said sheet retaining means for depositing the sheet conveyed by said carrier in said frame, said means retaining said carrier in elevated position comprises a lever mounted for movement about a fulcrum and having one end operatively connected to said carrier and the other end weighted for gravity retention of said carrier in said elevated position.

4. The apparatus of claim 3 wherein cam means are provided at said sheet retaining means for overcoming said gravity force and lowering said carrier thereby depositing the sheet carried thereby in said frame.

5. The apparatus of claim 4 wherein said cam means comprises a lever means held in retracted position for engagement with the weighted end of said carrier lever.

6. The apparatus of claim 4 wherein retention means are provided extending between the holding means and the sheet retaining means during said movement for supporting the weighted end of the carrier lever in elevated position during return movement of said mold plate and carrier toward said holding means, thereby maintaining the carrier in lowered position during said return movement, said weighted end operatively disengaging the support member at said sheet retaining means for said elevating of the carrier into engagement with the next sheet in said stack.

* * * * *